(12) United States Patent
Mizutani

(10) Patent No.: US 7,889,243 B2
(45) Date of Patent: Feb. 15, 2011

(54) IMAGING DEVICE, METHOD OF PROCESSING CAPTURED IMAGE SIGNAL AND COMPUTER PROGRAM

(75) Inventor: Tomoyuki Mizutani, Kanagawa (JP)

(73) Assignee: Sony Corporation (JP)

( * ) Notice: Subject to any disclaimer, the term of this patent is extended or adjusted under 35 U.S.C. 154(b) by 463 days.

(21) Appl. No.: 12/150,693

(22) Filed: Apr. 30, 2008

(65) Prior Publication Data

US 2008/0284866 A1 Nov. 20, 2008

(30) Foreign Application Priority Data

May 14, 2007 (JP) ............................ P2007-128200

(51) Int. Cl.
H04N 5/228 (2006.01)
H04N 5/76 (2006.01)
H04N 5/235 (2006.01)
H04N 5/225 (2006.01)

(52) U.S. Cl. ................. 348/222.1; 348/362; 348/231.6; 348/220.1; 348/333.01

(58) Field of Classification Search ............. 348/220.1, 348/222.1, 207.99, 231.2, 221.1, 362, 231.6
See application file for complete search history.

(56) References Cited

U.S. PATENT DOCUMENTS 5,043,816 A * 8/1991 Nakano et al. ......... 348/333.01
6,570,614 B1 * 5/2003 Kubo et al. .............. 348/231.6
7,408,574 B2 * 8/2008 Miyazaki ................. 348/231.1
2007/0270182 A1 * 11/2007 Gulliksson et al. .......... 348/362

FOREIGN PATENT DOCUMENTS

| JP | 05-328279 A | 12/1993 |
| JP | 10-257365 A | 9/1998 |
| JP | 10313422 | * 11/1998 |
| JP | 2001-257977 A | 9/2001 |
| JP | 2001257925 | * 9/2001 |

* cited by examiner

*Primary Examiner*—Nhan T Tran
(74) *Attorney, Agent, or Firm*—Lerner, David, Littenberg, Krumholz & Mentlik, LLP

(57) ABSTRACT

A constant amount of new portion of image data as still images is always stored on a memory in an image taking operation. In response to a shutter release operation, the image data stored on the memory is recorded onto a recording medium. A next new portion of the image data generated subsequent to the shutter release operation is then recorded on the recording medium. A predetermined pixel count, smaller than a standard pixel count set in the image data subsequent to the shutter release operation, is set in the image data prior to the shutter release operation. Process time for multi-shot operation is shortened in order to prevent photo opportunity missing. The pixel count in the image data subsequent to the shutter release operation remains unchanged so that the image data of high image quality is acquired.

5 Claims, 9 Drawing Sheets

IMAGING DEVICE, METHOD OF PROCESSING CAPTURED IMAGE SIGNAL AND COMPUTER PROGRAM

CROSS REFERENCES CROSS-REFERENCE TO RELATED APPLICATIONS

The present application claims priority from Japanese Patent Application No. JP 2007-128200, filed in the Japanese Patent Office on May 14, 2007, the entire content of which is incorporated herein by reference.

BACKGROUND OF THE INVENTION

1. Field of the Invention

The present invention relates to an imaging device recording, on a recording medium, a still image captured as image information and an image signal processing method of the imaging device. The present invention also relates to a computer program to be executed by the imaging device.

2. Description of the Related Art

Imaging devices such as digital still cameras are now in widespread use. Such an imaging device records still image data obtained from a captured image onto a recording medium during photographing.

When a photographing operation is performed, an actually taken picture often shows that the shutter release timing slips from the best timing of photo opportunity. This is particularly true when a subject is moving. One of the reasons for the timing difference is that it takes time for humans to take action in response to sensing the photo opportunity. Since the imaging device is operated by the human operator, missing the photo opportunity due to release timing delay is unavoidable.

Japanese Unexamined Patent Application Publications Nos. 5-328279 and 10-257365 disclose imaging devices such as digital still cameras that prevent photo opportunity timing slip by taking a predetermined number of images prior to a shutter release operation timing. Such a photo opportunity slip prevention function causes the imaging device to take and record pictures prior to the shutter release operation. Even when the shutter release operation is untriggered, a predetermined number of images of captured still image data is stored on a memory. It is highly likely that the recorded still image data, namely, photographs contain an image the user has intended to take. This arrangement frees the user from missing the photo opportunity due to shutter timing slip.

SUMMARY OF THE INVENTION

It is thus desirable to provide a photo opportunity slip prevention function in an imaging device. The photo opportunity slip prevent function is desirably improved in step with the current technological advancement of the imaging device and serves the user's convenience.

In accordance with one embodiment of the present invention, an imaging device, includes an image signal acquisition unit for acquiring an image signal in an electrical form by converting input image-bearing light into the image signal, a data generation unit for generating successively image data containing a still image by inputting successively the image signal corresponding to one still image unit, a data storage control unit for storing, on a predetermined memory thereof, the image data generated by the data generation unit, the image data acquired in retrospect within a unit time before a current time point, a record control unit for recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored on the data storage control unit at the timing of the shutter release operation, and the image data subsequent to the shutter release operation being generated during a predetermined period of time extending from the timing of the shutter release operation to a later time point, an operation unit for performing an operation to modify a pixel count of the image data on one of the image data prior to the shutter release operation and the image data subsequent to the shutter release operation, the image data containing a two-dimensional set of pixels, and a pixel count setting control unit for controlling setting of the pixel count so that the pixel count of one of the image data prior to the shutter release operation and the image data subsequent to the shutter release operation specified in the operation performed by the operation unit reaches the pixel count specified in the operation of the operation unit and so that the pixel count of the other of the image data prior to the shutter release operation and the image data subsequent to the shutter release operation reaches a predetermined pixel count set as a standard value.

In accordance with one embodiment of the present invention, an image signal processing method includes steps of acquiring an image signal in an electrical form by converting input image-bearing light into the image signal, generating successively image data containing a still image by inputting successively the image signal corresponding to one still image unit, storing, on a predetermined memory, the generated image data, the image data acquired in retrospect within a unit time before a current time point, recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored at the timing of the shutter release operation, and the image data subsequent to the shutter release operation being generated during a predetermined period of time extending from the timing of the shutter release operation to a later time point, storing setting information relating to the pixel count modified in response to a modification operation of the pixel count of the image data performed on one of the image data prior to the shutter release operation and the image data subsequent to the shutter release operation, the image data containing a two-dimensional set of pixels, and controlling setting of the pixel count so that the pixel count of one of the image data prior to the shutter release operation and the image data subsequent to the shutter release operation, modified in the modification operation, reaches the pixel count specified in the setting information and so that the pixel count of the other of the image data prior to the shutter release operation and the image data subsequent to the shutter release operation, unmodified in the modification operation, reaches a predetermined pixel count set as a standard value.

In accordance with one embodiment of the present invention, a computer program for an imaging device, includes steps of generating successively image data containing a still image by inputting successively an image signal in an electrical form corresponding to one still image unit, the image signal converted from input image-bearing light, storing, on a predetermined memory, the image data generated by the data generation unit, the image data acquired in retrospect within a unit time before a current time point, recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored at the timing of the shutter release operation, and the image data subsequent to the shutter release operation being generated during a predetermined period of time extending from the timing of the shutter release operation to a later time point, storing setting information relating to the pixel count modified in response to a modification operation of the pixel count of the image data performed on one of the image data prior to the shutter release operation and the image data subsequent to the shutter release operation, the image data containing a two-dimensional set of pixels, and controlling setting of the pixel count so that the pixel count of one of the image data prior to the shutter release operation and the image data subsequent to the shutter release operation, modified in the modification operation, reaches the pixel count specified in the setting information and so that the pixel count of the other of the image data prior to the shutter release operation and the image data subsequent to the shutter release operation, unmodified in the modification operation, reaches a predetermined pixel count set as a standard value.

The image signal obtained through converting the image-bearing light is input, and the image data as still images are successively generated in response. The generated image data obtained in retrospect within the predetermined period of time before the current time point is stored on the memory area. In response to the shutter release operation, the recording medium then stores the image data stored on the memory area prior to the shutter release operation and the image data subsequent to the shutter release operation being generated within the predetermined period of time extending from the timing of the shutter release operation to the later time point. With this arrangement, the imaging device can store the image data obtained within predetermined periods of time prior to and subsequent to the shutter release operation timing. The photo opportunity slip prevention function is thus provided.

In accordance with embodiments of the present invention, the user can set and modify the number of pixels of one of the image data prior to the shutter release operation and the image data subsequent to the shutter release operation. More specifically, the user can set the pixel count of one of the image data prior to the shutter release operation and the image data subsequent to the shutter release operation to be smaller than the pixel count of the other of the image data prior to the shutter release operation and the image data subsequent to the shutter release operation.

The pixel count is set to respond to an amount of information of the image data. A process time to generate the image data changes in accordance with the pixel count. With a smaller pixel count, the number of units of image data acquired per unit time increases. As the number of units of image data obtained per unit time increases, the possibility of photo opportunity slip becomes small. The more the pixel count, the higher the quality of the image data becomes.

In accordance with embodiments of the present invention, a magnitude relation is introduced in the pixel count between the image data prior to the shutter release operation and the image data subsequent to the shutter release operation. In accordance with embodiments of the present invention, the image data obtained through the multi-shot operation based on the photo opportunity slip prevention function provides two types of image data, namely the image data recorded with a relatively small pixel count but at short multi-shot intervals and the image data recorded at a relatively high image quality but at long multi-shot intervals. In view of the whole image data recorded in response to a single shutter release operation with the photo opportunity slip prevention function activated, the photo opportunity slip prevention function is reinforced while the high image quality is maintained.

The photo opportunity slip prevention function convenient to and useful for the user is thus provided.

DESCRIPTION OF THE PREFERRED EMBODIMENTS

The embodiments of the present invention are described below with reference to the drawings. A digital still camera is applied as an imaging device 1 in accordance with one embodiment of the present invention.

Figure 1:
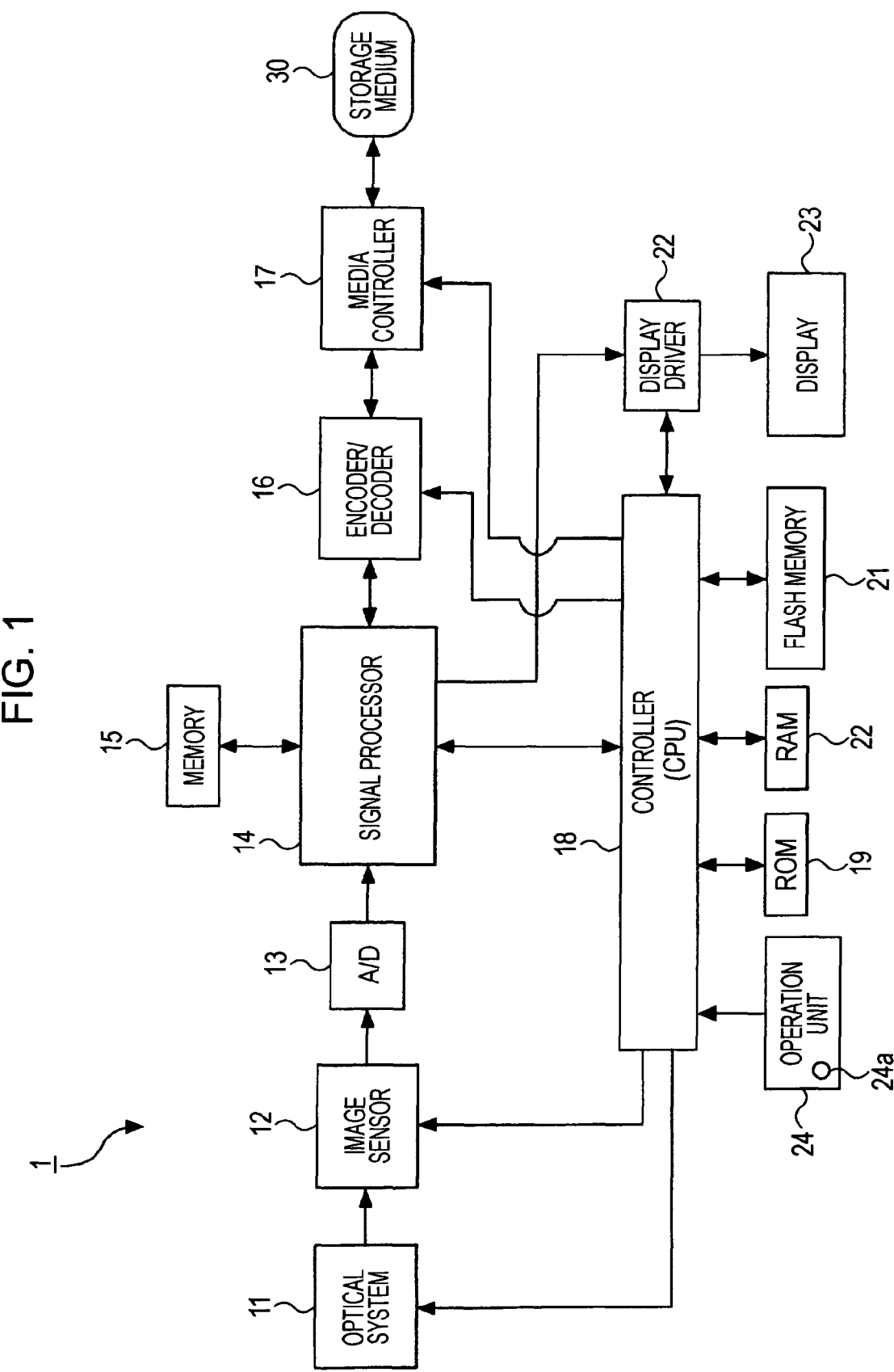
FIG. 1 is a block diagram of an imaging device in accordance with one embodiment of the present invention.

FIG. 1 illustrates the imaging device 1 in accordance with the embodiment of the present invention.

The imaging device 1 has a basic function to acquire image-bearing light and convert the image-bearing light into an electrical signal. The imaging device 1 then processes the resulting signal, thereby resulting in image data as a captured still image. The image data is then stored on a recording medium and displayed on a display 23 as an image.

As shown in FIG. 1, an optical system 11 includes a group of lenses, composed of a plurality of imaging lenses such as a zoom lens and a focusing lens, and an iris unit. The optical system 11 focuses input light as an image-bearing light beam on an image sensor 12.

The optical system 11 also includes drivers for driving the zoom lens, the focusing lens, and the iris unit. The drivers are controlled by the controller 18 that performs camera control. The camera control includes a zoom control process, an auto focus control process and an auto exposure control process.

The image sensor 12 performs photoelectric conversion to convert the image-bearing light beam picked up by the optical system 11 into the electrical signal. The image sensor 12 receives the image-bearing light beam from the optical system 11 on a light receiving surface of a photoelectric converter element and successively outputs, at predetermined timings, a signal charge accumulated in response to a strength of received light. The electrical signal (image signal) responsive to the image-bearing light thus results. The photoelectric converter element employed for the image sensor 12 is not limited to any particular one. For example, a complementary metal oxide (CMOS) or a charge coupled device (CCD) may be used for the image sensor 12. If a CMOS sensor is employed, the CMOS sensor corresponding to the image sensor 12 may include an analog-to-digital converter corresponding to an A/D converter 13.

The image signal output from the image sensor 12 is input to the A/D converter 13 for analog-to-digital conversion. A resulting digital signal is input to a signal processor 14.

The signal processor 14 receives the digital image signal from the A/D converter 13 by still image unit (frame image). Predetermined signal processing is performed on the image signal received by still image unit. The image data corresponding to a single still image is thus obtained. The image data is then written on a memory 15.

The image data generated by the signal processor 14 is to be stored on a recording medium 30 as information of a captured image corresponding to a photograph. In this case, the image data corresponding to a single still image is output from the signal processor 14 to the encoder/decoder 16.

In accordance with a predetermined still image compression encoding method, the encoder/decoder 16 performs a compression encoding process on the image data output by still image unit from the signal processor 14. The encoder/decoder 16 under the control of the controller 18 adds a head to the compressed image data, thereby converting the image data into a compressed still image file in a predetermined format. The compressed still image file thus generated is then transferred to a media controller 17. The media controller 17 under the control of the controller 18 writes the data of the compressed still image file onto the recording medium 30. The recording medium 30 is a compact removable type medium such as a flash memory. The recording medium 30 is inserted into a slot thereof arranged in the imaging device 1.

The imaging device 1 causes the image data obtained by the signal processor 14 to be displayed on a display 23. The imaging device 1 thus displays on the display 23 a monitor image currently captured. Upon receiving the image data output from the A/D converter 13, the signal processor 14 generates the image data of one still image. By repeating such an operation, the signal processor 14 generates the image data corresponding to a frame in a moving image. Under the control of the controller 18, the signal processor 14 transfers to a display driver 22 the image data thus successively generated.

The display driver 22 generates a driver signal driving the display 23, based on the image data input from the signal processor 14. The display driver 22 thus displays images in accordance with the image data on a per still image unit basis.

The user sees the images successively displayed on the display driver 22 as a monitor. The user may feel as if viewing a moving picture.

The imaging device 1 plays the still image file stored on the recording medium 30 and causes the image to be displayed on the display 23.

By specifying a particular still image file, the controller 18 commands the media controller 17 to read the corresponding data from the recording medium 30. In response to the command, the media controller 17 accesses an address on the recording medium 30 storing the specified still image file, reads the data, and then transfers the read data to the encoder/decoder 16.

The encoder/decoder 16 under the control of the controller 18 extracts a data body as the image data from the data of the still image file transferred from the media controller 17 and acquires the image data of one still image by performing a decoding process on the compressed still image data. The encoder/decoder 16 transfers the decoded image data to the display driver 22. The display driver 22 thus displays on the display 23 the image of the still image file stored on the recording medium 30.

The display 23 can display a user interface image functioning a graphic user interface (GUI) together with the monitor image and the played image of the still image file. Depending on an operational status of the imaging device 1, the controller 18 generates display image data as a user interface image and outputs the generated display image data to the display driver 22. The display driver 22 thus displays the user interface image. As a particular menu screen, the user interface image may be displayed on the display screen of the display 23 separately from the monitor image and the played image of the still image file. Alternatively, the user interface image may be overlaid on or combined with the monitor image or the played image of the still image file.

The controller 18 includes a central processing unit (CPU) and forms a micro computer together with a read-only memory (ROM) 19 and a random-access memory (RAM) 20. The ROM 19 stores a program to be performed by the CPU as the controller 18 and a variety of setting information related to an operation of the imaging device 1. The RAM 20 serves as a main memory for the CPU.

The flash memory 21 is a non-volatile storage area to store a variety of setting information that is updated in accordance with user operation and operation history of the imaging device 1. If a non-volatile memory such as a flash memory is used for the ROM 19, part of the ROM 19 may be substituted for the flash memory 21.

The operation unit 24 includes a variety of controls for the imaging device 1 and an operation information signal output section for outputting to the CPU an operation information signal generated in response to an operation of each control. In response to the operation information signal input via the operation unit 24, the controller 18 performs a predetermined process responsive to the input operation information signal. The imaging device 1 thus performs an operation responsive to the user operation.

A shutter key 24a as a control on the operation unit 24 is illustrated in FIG. 1. The shutter key 24a enters a trigger for photographing and has a structure receiving a pressing action. If the shutter key 24a is half-pressed (for focusing), the auto focus control process is performed. The imaging device 1 automatically adjusts focusing (in focusing lens driving) to focus on a subject to be photographed. If the shutter key 24a is further pressed to a full-pressed state from the half-pressed state (in shutter release operation), a captured image is recorded. The still image file obtained from the image signal (with a data body thereof being the image data) is recorded on the recording medium 30.

The imaging device 1 in accordance with one embodiment of the present invention performs a photographing and recording operation to record the captured image (still image file) onto the recording medium 30. The photographing and recording operation is performed in a standard photographing mode in which a standard photographing operation is preformed to record a captured image.

In the standard photographing mode, the imaging device 1 records on the recording medium 30 a captured image photographed in response to the shutter release operation on the shutter key 24a. The captured image is a single still image file as the image data for one still image.

In accordance with one embodiment of the present invention, the photographing and recording operation may be performed in a photo opportunity slip prevention function. The photo opportunity slip prevention function is performed with reference to the shutter release operation. More specifically, the recording medium 30 stores a plurality of still images (still image file) multi-shot photographed in retrospect within a predetermined period of time before the shutter release operation and a plurality of still images (still image file) multi-shot photographed within a predetermined period of time extending from the shutter release operation into a later time point.

The term "multi-shot" photographed means that the recording of images (still image file) consecutively captured at predetermined intervals on a recording medium is automatically performed by the imaging device 1.

The standard photographing mode means a typical photographing operation widely performed by digital still cameras. As previously discussed, it is difficult to obtain an image at a timing intended by the user in the photographing and recording operation in the standard photographing mode. More specifically, it is likely that the user slips a photo opportunity timing desired by the user. As previously discussed, a time lag takes place between when the human user perceives the photo opportunity and when the user presses the shutter key in response thereto. Even if the user think he or she has immediately pressed in response to the photo opportunity, a slight time lag actually takes place in the pressing of the shutter key 24a. A digital imaging device such as a digital still camera has other factors that cause a time lag between the shutter release operation timing and the image pickup timing desired by the user. The other factors include a data rate of the signal from the image sensor and a time to process a digital signal.

The images multi-shot photographed within predetermined periods of time prior to and subsequent to the shutter release operation are recorded on the recording medium 30 in the photo opportunity slip prevention function. It is highly likely that an image taken at a timing desired by the user or an image taken at a timing close to the desired timing is contained in the recorded images.

In accordance with one embodiment of the present invention, the user may select in the photo opportunity slip prevention function between the standard mode and the preceding image prioritized mode.

In the standard mode, images (preceding images) taken prior to the shutter release operation timing and images (subsequent images) taken subsequent to the shutter release operation timing are multi-shot photographed at a standard pixel count set as appropriate for the photo opportunity slip prevention function.

In the preceding image prioritized mode, the subsequent images are multi-shot photographed at the standard pixel count but the preceding images are multi-shot photographed at a predetermined pixel count smaller than the standard pixel count.

When the image data corresponding to a single still image is composed of a set of two-dimensional pieces of image data, the pixel count indicates the actual number of pieces of image data forming the actual image data. Generally, the pixel count is obtained by multiplying the number of pieces of image data in a horizontal direction and the number of pieces of image data in a vertical direction.

The pixel count corresponds to the pixel count of a light receiving unit in the image sensor 12 for picking up an effective image signal (imaging pixel count) if no decimation is performed on the image data in a signal processing operation and if no pixel count conversion process is performed through interpolation.

In the preceding image prioritized mode in accordance with one embodiment of the present invention, the number of images multi-shot recorded per unit time may increase more than when the multi-shot recording is performed with a standard pixel count. In other words, a time interval between the recording of one image and the recording of a next image in the multi-shot recording process (hereinafter referred to as multi-shot interval) is shorter than that in the standard mode.

With a shorter multi-shot interval, an image desired by the user or an image close to the desired image is more likely to be obtained than in the standard mode.

As understood from the analysis of the photo opportunity slip, the image desired by the user can be obtained from the images taken subsequent to the shutter release operation timing. However, it is more likely that the image desired by the user is obtained from the images taken prior to the shutter release operation timing. More specifically, the preceding image prioritized mode is intended to avoid the photo opportunity slip with a higher probability. The preceding images have thus higher priority so that more images are obtained per unit time (with shorter multi-shot intervals).

The switching in the photo opportunity slip prevention function between the preceding image prioritized mode and the standard mode modifies the multi-shot intervals in the multi-shot recording of the preceding images. In accordance with one embodiment of the present invention, the photo opportunity slip prevention function is activated and the user selects between the preceding image prioritized mode and the standard mode in the photo opportunity slip prevention function.

When the user thinks the photo opportunity slip prevention more important, the user can set the preceding image prioritized mode. With this setting, the preceding images about which the photo opportunity slip is considered to take place with a higher probability are multi-shot photographed with shorter multi-shot intervals. The possibility of the photo opportunity slip is thus lowered.

In the preceding image prioritized mode, the pixel count of each preceding image, i.e., the definition of the image is lowered. If the user thinks a high-definition image more important even with some possibility of the photo opportunity slip left, the use of the standard mode is advisable. With the photo opportunity slip prevention function, the user may select between the high-definition image and the photo opportunity slip prevention by selecting one of the two modes relating to the multi-shot intervals.

In the preceding image prioritized mode, a standard pixel count M is set for the subsequent images, resulting in a high-definition image. The preceding image prioritized mode may be considered to reinforce the photo opportunity slip prevention function and still assure the high-definition image in terms of the entire image data recorded with respect to the shutter release operation.

The photo opportunity slip prevention function of one embodiment of the present invention is described below.

When a photographing operation is activated with the photo opportunity slip prevention function set, the imaging device 1 operates to always store on the memory 15 the image data as images photographed within a predetermined period extending in retrospect from the present time (preceding image storing operation). The imaging device 1 performs this operation regardless of which of the standard mode or the preceding image prioritized mode the imaging device 1 is in. The image data stored on the memory 15 can become a still image file to be stored on the recording medium 30 as multi-shot recorded preceding images.

Figure 2:
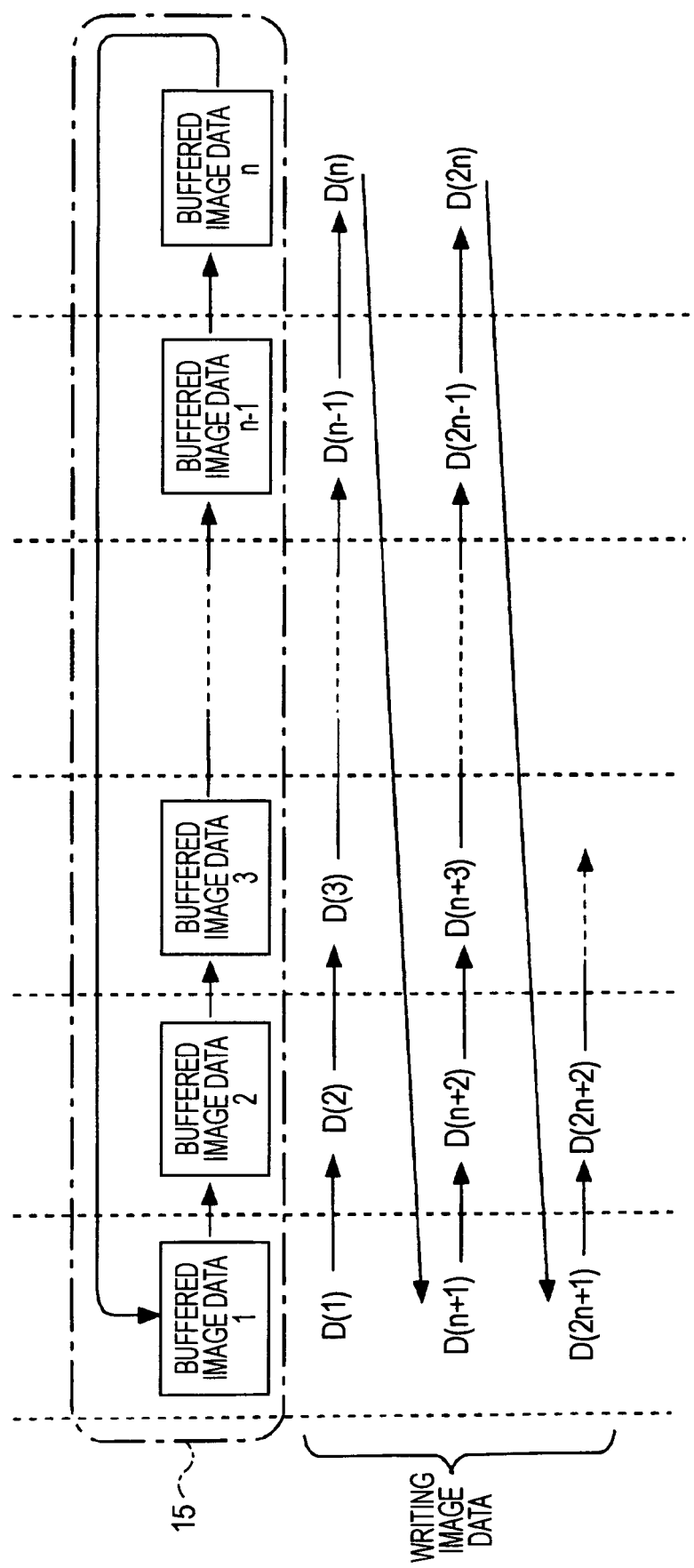
FIG. 2 diagrammatically illustrates a signal processing operation performed prior to a shutter release operation of the imaging device with a photo opportunity slip prevention function activated in accordance with one embodiment of the present invention.

FIG. 2 diagrammatically illustrates a signal processing procedure in the preceding image storage operation.

When the photographing operation starts with the photo opportunity slip prevention function activated, the signal processor 14 receives the signal image signal from the image sensor 12 via the A/D converter 13 and successively generates the image data corresponding to one still image. The image data thus generated is written and stored on an image data storage area of a predetermined memory capacity in the memory 15. The image data corresponding to one still image (captured image) is buffered on the memory 15. The image data is thus referred to as buffered image data.

When the photographing operation starts with the photo opportunity slip prevention function activated, the signal processor 14 writes first generated image data D(1) onto the memory 15. The signal processor 14 then successively generates and then writes image data D(2), D(3), . . . onto the memory 15. The memory 15 stores the buffered image data in the order of from old to new data. At the moment the storage operation proceeds to n-th buffered image data n, the memory 15 has no further memory space available for storing next buffered image data in the buffered image data storage area.

In this state, the signal processor 14 stores buffered image data D(n+1) at next (n+1)-th image by overwriting the buffered image data D(1) on the memory 15. The buffered image data D(1) is thus replaced with the buffered image data D(n+1). The signal processor 14 successively writes buffered image data D(n+2), . . . D(2n) at (n+2)-th, . . . , 2n-th images by overwriting buffered image data D(2), . . . , D(n) stored as buffered image data 2 through n. A similar overwriting process is repeated on buffered image data D(2n+1), D(2n+2), . . . by overwriting the buffered image data stored as buffered image data 1, 2, . . . on the memory 15.

In this way, the signal processor 14 updates the buffered image data stored on the memory 15 in a first-in-first out basis if the stored buffered image reaches a maximum number n. In other words, the oldest buffered image data is successively overwritten by new image data. When the imaging device 1 performs the photographing operation with the photo opportunity slip prevention function activated, the memory 15 always stores the latest image data of n images multi-shot photographed within a predetermined period of time in retrospect from the present time (except a duration of time throughout which the image data 1 through 2 is stored).

The standard mode in the photo opportunity slip prevention function is described below with reference to FIG. 3.

Figure 3:
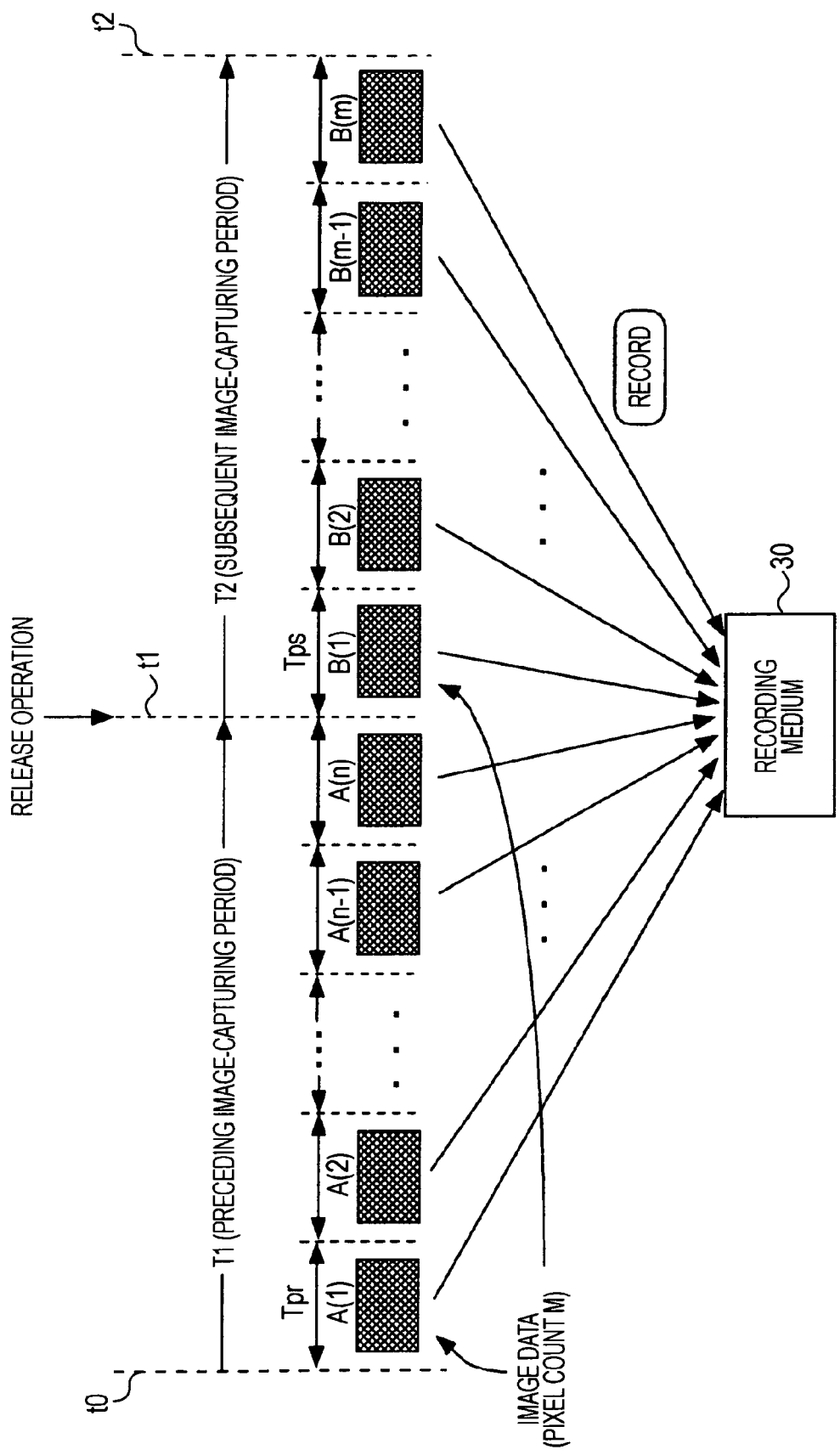
FIG. 3 diagrammatically illustrates a photographing and recording operation of the imaging device working in a standard mode of the photo opportunity slip prevention function in accordance with one embodiment of the present invention.

FIG. 3 illustrates image data A(1)-A(n) and image data B(1)-B(m). The image data is stored as the still image file on the recording medium 30 at timing of time t1 of the shutter release operation. FIG. 3 diagrammatically illustrates timings at which the signal processor 14 generates and stores the image data onto the memory 15.

As previously discussed with reference to FIG. 2, the latest n units of image data are stored in the photographing operation with the photo opportunity slip prevention function activated. In FIG. 3, the latest image data stored on the memory 15 is illustrated as n units of image data A(1)-A(n) generated within a period T1 extending in retrospect from the shutter release operation at time point t1 to time point t0.

For example, during a time length represented by process time Tpr starting at time point t0, the image data as the image data A(1) is generated from the image signal output from the image sensor 12 and then written onto the memory 15. This process repeated every process time Tpr. The image data as the image data A(2)-A(n) is generated and written onto the memory 15. The image data A(1)-A(n) as the preceding image data are closer to the present time in the order of A(1), A(2), . . . , A(n) with A(n) closest to the present time.

Each of the image data A(1)-A(n) has a pixel count of M. The pixel count M is determined for the standard mode.

The shutter release operation might be performed at time point t1.

The signal processor 14 in the imaging device 1 reads the image data stored on the signal processor 14, namely, the image data A(1)-A(n) of FIG. 3 at the shutter release operation timing at time point t1. The imaging device 1 then causes the signal processor 14 to write successively the image data onto the recording medium 30 as a still image file. The preceding images are stored first.

The signal processor 14 in the imaging device 1 generates the image data, namely, the image data B(1), B(2), . . . based on the image signal obtained on a real-time basis even after the shutter release operation at time point t1. In the standard mode, each of the image data B(1), B(2), . . . generated subsequent to time point t1 has a pixel count M. With each of the image data having a pixel count of M, the process time Tps of each of the image data B(1), B(2), . . . remain equal to the process time Tpr of each of the image data A(1)-A(n).

In this standard mode, the signal processor 14 in the imaging device 1 stores the m images of image data B(1)-B(m) obtained within a subsequent image-capturing period T2 from the shutter release operation at time point t1 to time point t2 onto the recording medium 30 as a still image file. The image data B(1)-B(m) stored on the recording medium 30 is subsequent images.

The preceding image-capturing period T1 is set to a time length appropriate to achieve most the photo opportunity slip prevention effect. If the preceding image-capturing period T1 is too short, the images obtained within a short period immediately prior to the shutter release operation are obtained. An image before the short period escapes capturing. If the preceding image-capturing period T1 is too long, the images extending in retrospect too long into the past are stored on the memory 15 and then recording medium 30. This is not preferable in view of overuse of the memory capacity of each of the memory 15 and the recording medium 30. The preceding image-capturing period T1 is set to be appropriate not to cause such inconveniences.

Like the preceding image-capturing period T1, the subsequent image-capturing period T2 is set to be appropriate to achieve most the photo opportunity slip prevention effect. In accordance with one embodiment of the present invention, the subsequent image-capturing period T2 is set to be approximately equal to the preceding image-capturing period T1.

The pixel count M is specifically described below. A maximum pixel count M may be set to be a maximum pixel count corresponding to the number of effective pixels of the image sensor 12. The larger the pixel count, the larger the data size of the image data. If the maximum pixel count is set, the full image data cannot be stored on a memory area of the memory 15 assigned to the preceding image data. In such a case, a predetermined pixel count smaller than the maximum image pixel count may be set for the pixel count M taking into consideration a roughness of the image permissible in the standard mode and the number of images required as the preceding images.

Figure 4:
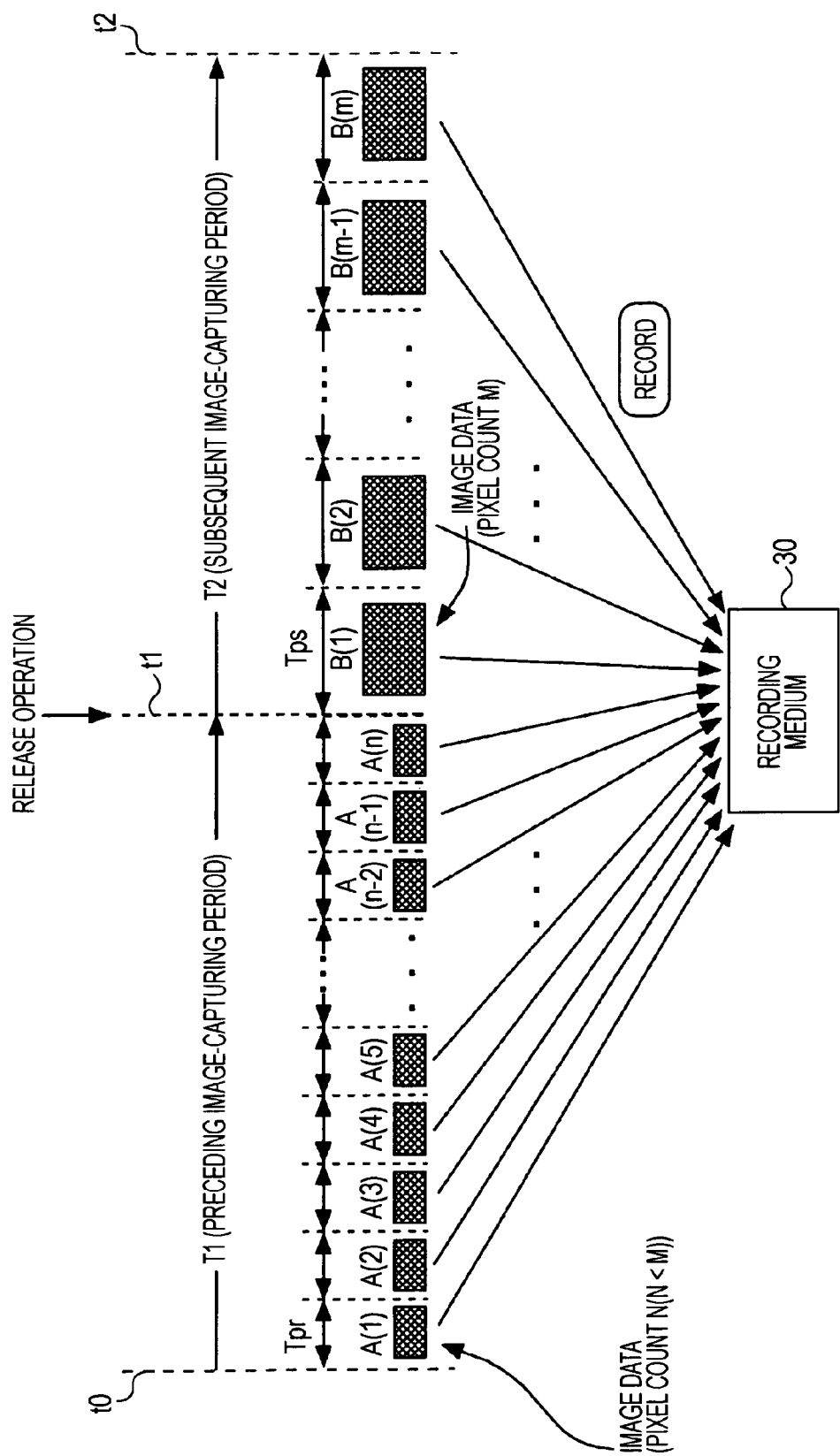
FIG. 4 diagrammatically illustrates the photographing and recording operation of the imaging device working in a preceding image prioritized mode of the photo opportunity slip prevention function in accordance with one embodiment of the present invention.

FIG. 4 illustrates the preceding image prioritized mode in the photo opportunity slip prevention function.

In the preceding image prioritized mode, the image data A(1)-A(n) as the preceding image data is set to have a predetermined pixel count N smaller than the pixel count M for the standard mode.

In accordance with one embodiment of the present invention, the pixel count of the image data is determined by setting, on the image sensor 12, capturing pixels of the pixel count corresponding to the pixel count of the image data. As shown in FIG. 3, to set each of the image data A(1)-A(n) to have the pixel count of M, the capturing pixel count corresponding to the pixel count of M is set on the image sensor 12. If each of the image data A(1)-A(n) is set to have the pixel count N, the capturing pixel count N is set to the image sensor 12.

If the capturing pixel count set to be on the image sensor 12 is modified, the process time Tpr for generating and writing the image data A(1)-A(n) on the memory 15 is different from the process time Tpr for the standard mode.

Before generating and then writing the image data onto the memory 15, the image signal of one still image is output from the image sensor 12 via the A/D converter 13 and then retrieved by the signal processor 14. The time of retrieving the image signal becomes long in proportion to the capturing pixel count set on the image sensor 12. The transfer speed of a signal per pixel depending on a transfer clock remains constant regardless of the capturing pixel count. An increase in the capturing pixel count set on the image sensor 12 leads to an increase in the process time for the signal processor 14 to generate the image data from the retrieved image signal and the time for the generated image data to be transferred from the signal processor 14 to the memory 15 for storage. The more the pixel count, the larger the data size of the image data. In the signal processing, the time to process one unit of image data and the time to transfer the generated image data increase accordingly.

The pixel count N smaller than the pixel count M is set at each of the image data A(1)-A(n) as the preceding images in the preceding image prioritized mode of FIG. 4. The process time Tpr for each of the image data A(1)-A(n) is shorter than the process time Tpr in the standard mode.

The short process time Tpr means that the time period to the next session of the multi-shot images is short if the image data A(1)-A(n) is viewed as the multi-shot result. The short process time Tpr is translated into an increase in the number of images obtained from multi-shot operation per unit time. With short multi-shot intervals, the possibility of the photo opportunity slip prior to the shutter release operation is lower than in the standard mode.

The operation within the subsequent image-capturing period T2 from the shutter release operation at time point t1 remains identical to the operation in the standard mode of FIG. 3. More specifically, at the shutter release operation at time point t1 in the preceding image prioritized mode, the pixel count is changed from the pixel count N to the pixel count M for the standard mode. The image data B(1)-B(m) thus results and then are stored on the recording medium 30. Process time Tps of each of the image data B(1)-B(m) is equal to the process time Tps of FIG. 3.

The preceding image-capturing period T1 and the subsequent image-capturing period T2 in the photo opportunity slip prevention function are also approximately equal to the counterparts in the standard mode of FIG. 3. The subsequent image-capturing period T2 is more accurately equal to the counterpart in the standard mode of FIG. 2 than the preceding image-capturing period T1 is equal to the counterpart in the standard mode of FIG. 2 because the process time Tpr per image data changes from the standard mode to the preceding image prioritized mode. Given the approximately equal preceding image-capturing periods T1, the memory 15 stores more image data (as the preceding images) in the preceding image prioritized mode than in the standard mode. Also, given the approximately equal preceding image-capturing periods T1, the memory 15 stores approximately equal total amount of image data of n images in each of the standard mode and the preceding image prioritized mode.

In accordance with one embodiment of the present invention, the pixel count M of the image data for the standard mode may be 8 million pixels (8 M) and each of the preceding image-capturing period T1 and the subsequent image-capturing period T2 may be approximately 0.5 second. In the standard mode, seven to eight preceding images of image data may be obtained in each of the preceding image-capturing period T1 and the subsequent image-capturing period T2.

The pixel count M of the image data for the preceding image prioritized mode may be 2 million pixels (2 M) and each of the preceding image-capturing period T1 and the subsequent image-capturing period T2 may be approximately 0.5 second as in the standard mode. The process time Tpr to obtain the image data is proportional to the pixel count of the generated image data. The process time Tpr in the preceding image prioritized mode is about one quarter of the process time Tpr in the standard mode. In the preceding image prioritized mode, the number of images of image data obtained within the preceding image-capturing period T1 is about 30.

In the preceding image prioritized mode of FIG. 4, the pixel count of the image data is reduced to shorten the multi-shot intervals (corresponding to the process time Tpr) for the purpose of reducing the probability of the photo opportunity slip. Another technique of reducing the multi-shot intervals, as disclosed in Japanese Unexamined Patent Application Publication No. 5-328279, is to modify a pulse period (frequency) of a writing pulse signal determining a write timing to a memory. This technique allows the multi-shot intervals to be reduced with the pixel count of the image data remaining constant.

The image sensors in currently available imaging devices have a large pixel count and some of the image sensors have about 10 million pixels or so. The process time to generate and write one unit of image data in the imaging device increases accordingly. For technical and cost reasons, a processor generating the image data does not advance well in step with such an increase in the pixel count. Lengthening the process time of the image data makes the photographing operation slow and is hardly adopted as a technique in practice.

If the multi-shot interval (process time to generate the image data) is reduced by switching the frequency of the write pulse clock as disclosed in Japanese Unexamined Patent Application Publication No. 5-328279, the multi-shot interval needs to be set to be long with some degree of margin in the standard mode. If such a margin is permitted, the multi-shot interval in the image data of the pixel count M for the standard mode becomes too long to be practicable.

More specifically, in the current situation where the pixel counts of the image sensors in the imaging devices have been sharply increased, no sufficient photo opportunity slip prevention function can be provided by the technique disclosed in Japanese Unexamined Patent Application Publication No. 5-328279.

In accordance with one embodiment of the present invention, the multi-shot intervals are shortened by reducing the pixel count. With this arrangement, the maximum frequency can be always set for a clock signal for processing the image data and a practically sufficiently short time can be set for the multi-shot intervals of the image data of the pixel count M. In the preceding image prioritized mode, the multi-shot intervals can be shortened to the extent that the effect of reducing the probability of photo opportunity slip prevention is obtained.

According to Japanese Unexamined Patent Application Publication No. 10-257365, photographing interval T, corresponding to the multi-shot interval (process time Tpr) of one embodiment of the present invention, is set and modified. But the disclosure fails to state a technical arrangement of modifying the photographing interval. According to the disclosure, the photographing interval T is 0.5 second, 0.3 second, or the like. The technique of Japanese Unexamined Patent Application Publication No. 5-328279 for modifying the frequency of the write clock signal is also applicable to achieve the same purpose. In accordance with one embodiment of the present invention, eight to thirty images are multi-shot photographed within the preceding image-capturing period T1 as long as about 0.5 second. The photographing interval (multi-shot interval, namely, process time Tpr) is from about 62.5 ms to about 16 ms. The photographing interval is thus relatively shorter than the counterpart disclosed in Japanese Unexamined Patent Application Publication No. 10-257365. For this reason, the technique of varying (reducing) the pixel count of the image data becomes effective to shorten the multi-shot intervals.

The user selection operation selecting between the standard mode and the preceding image prioritized mode is described below.

The user operates a predetermined control on the operation unit 24 in the imaging device 1, thereby selecting one menu screen to enter setting related to the photo opportunity slip prevention function. The user thus causes the menu screen on the display 23 to select between the standard mode and the preceding image prioritized mode.

Figure 5:
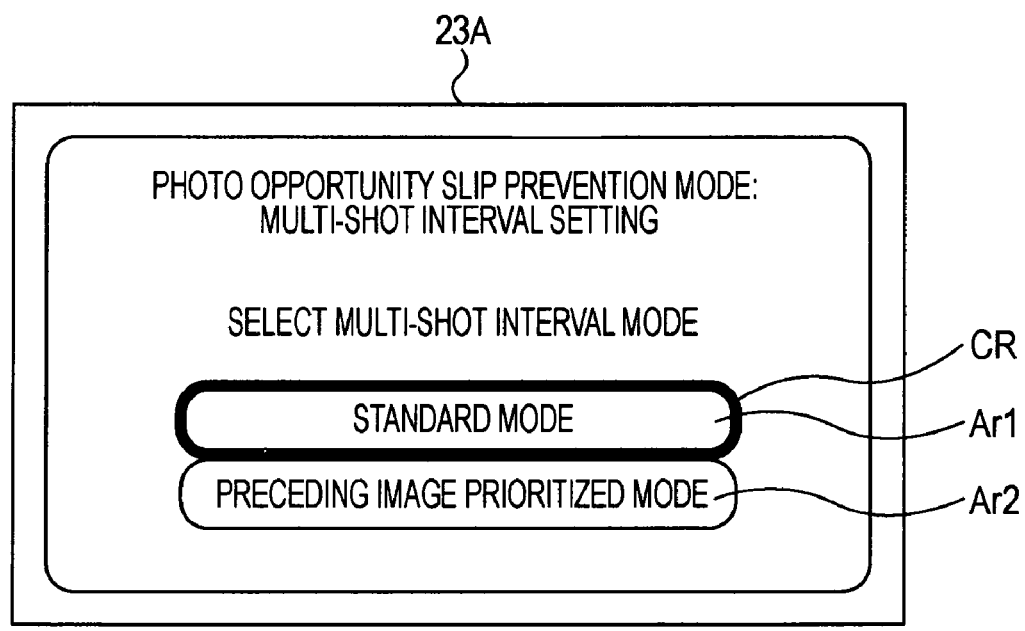
FIG. 5 illustrates an operation screen for selecting and setting multi-shot intervals (standard mode/preceding image prioritized mode) in the photo opportunity slip prevention function in accordance with one embodiment of the present invention.

FIG. 5 illustrates the menu screen (multi-shot interval setting screen) for setting the multi-shot interval displayed on a display screen 23A of the display 23. The multi-shot interval setting screen shows a standard mode selection area Ar1 and a preceding image prioritized mode selection area Ar2 and a cursor CR is placed in one of the selection areas Ar1 and Ar2.

The cursor CR is moved between the two selection areas Ar1 and Ar2 in response to an operation of a predetermined control by the user. The mode indicated by the selection area emphasized by the cursor CR placed thereon is the mode selected by the user. The user places the cursor CR on one of the standard mode selection area Ar1 and the preceding image prioritized mode selection area Ar2, whichever the user desires, and then performs a predetermined operation to enter the selection. The imaging device 1 sets one of the standard mode and the preceding image prioritized mode relating to the multi-shot interval in the photo opportunity slip prevention function.

The determined setting related to the multi-shot interval in the photo opportunity slip prevention function is stored on the flash memory 21 as multi-shot interval setting information. More specifically, the multi-shot interval setting information indicates which mode is selected to perform the photographing operation in the photo opportunity slip prevention function, the standard mode or the preceding image prioritized mode.

Figure 6:
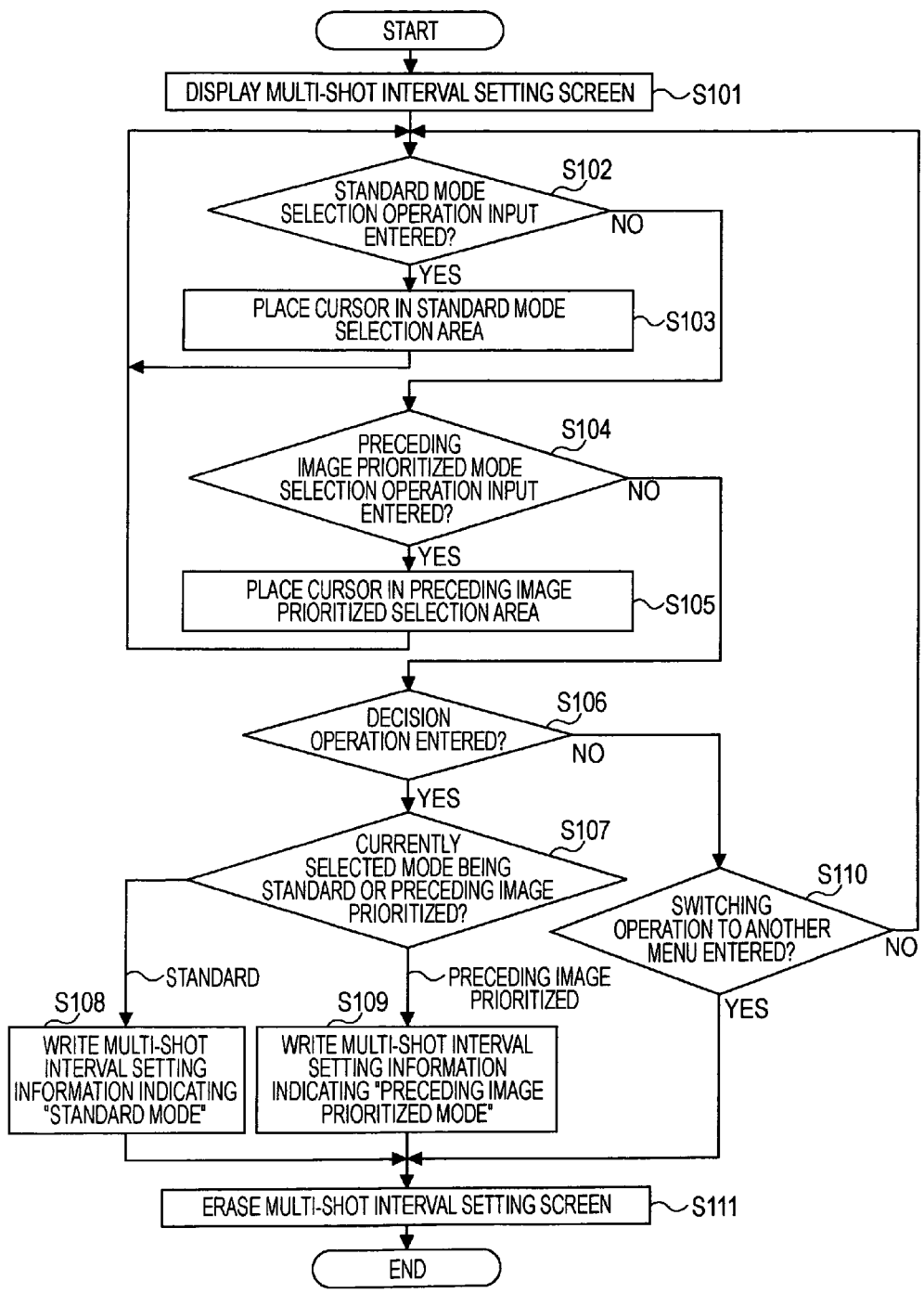
FIG. 6 illustrates a process performed by the imaging device in response to a selection setting of multi-mode intervals (standard mode/preceding image prioritized mode) in the photo opportunity slip prevention function in accordance with one embodiment of the present invention.

A flowchart of FIG. 6 illustrates an operation procedure performed by the imaging device 1 in order to respond to the multi-shot interval setting discussed with reference to FIG. 5. The process of FIG. 6 is performed in accordance with the program of the CPU as the controller 18. The same is true of flowcharts of FIGS. 7 through 9.

A command to display the multi-shot interval setting screen is now issued in response to the operation on the predetermined control on the operation unit 24 as previously discussed. The imaging device 1 (CPU) controls displaying of the multi-shot interval setting screen on the display 23 in step S101. When the multi-shot interval setting screen is displayed in step S101, the cursor CR is placed initially in a predetermined side of the standard mode selection area Ar1 and the preceding image prioritized mode selection area Ar2.

The imaging device 1 displaying the multi-shot interval setting screen in step S101 performs determination steps in steps S102, S104, S106 and S110. More specifically, the imaging device 1 waits on standby for a predetermined operation for selecting the standard mode (step S102), a predetermined operation for selecting the preceding image prioritized mode (step S104), a decision operation (step S106), and a predetermined operation to shift to another menu (step S110).

If it is determined in step S102 that the operation for selecting the standard mode has been performed, processing proceeds to step S103. The imaging device 1 places the cursor CR in the standard mode selection area Ar1.

If it is determined in step S104 that the operation for selecting the preceding image prioritized mode has been performed, processing proceeds to step S105. The imaging device 1 places the cursor CR in the preceding image prioritized mode selection area Ar2.

If it is determined in step S110 that the operation for shifting to another menu is performed, processing proceeds to step S111. The imaging device 1 quits displaying the multi-shot interval setting screen and displays a menu screen specified in the operation performed in step S110.

If it is determined in step S106 that the decision operation has bee performed, processing proceeds to step S107.

The imaging device 1 determines in step S107 which of the standard mode and the preceding image prioritized mode has been selected currently (at the moment the decision operation has been performed). The cursor CR placed in the standard mode selection area Ar1 on the multi-shot interval setting screen means that the standard mode has been selected. The cursor CR placed in the preceding image prioritized mode selection area Ar2 means that the preceding image prioritized mode has been selected.

If it is determined in step S107 that the standard mode has been selected, the imaging device 1 generates in step S108 the multi-shot interval setting information indicating the standard mode and writes the multi-shot interval setting information onto the flash memory 21.

If it is determined in step S107 that the preceding image prioritized mode has been selected, the imaging device 1 generates in step S109 the multi-shot interval setting information indicating the preceding image prioritized mode and writes the multi-shot interval setting information onto the flash memory 21.

Subsequent to one of steps S108 and S109, the imaging device 1 proceeds to step S111. The imaging device 1 erases the multi-shot interval setting screen and shifts to another process. For example, the imaging device 1 displays another menu screen or another monitor screen, or plays an image of a still image file stored on the recording medium 30.

Figure 7:
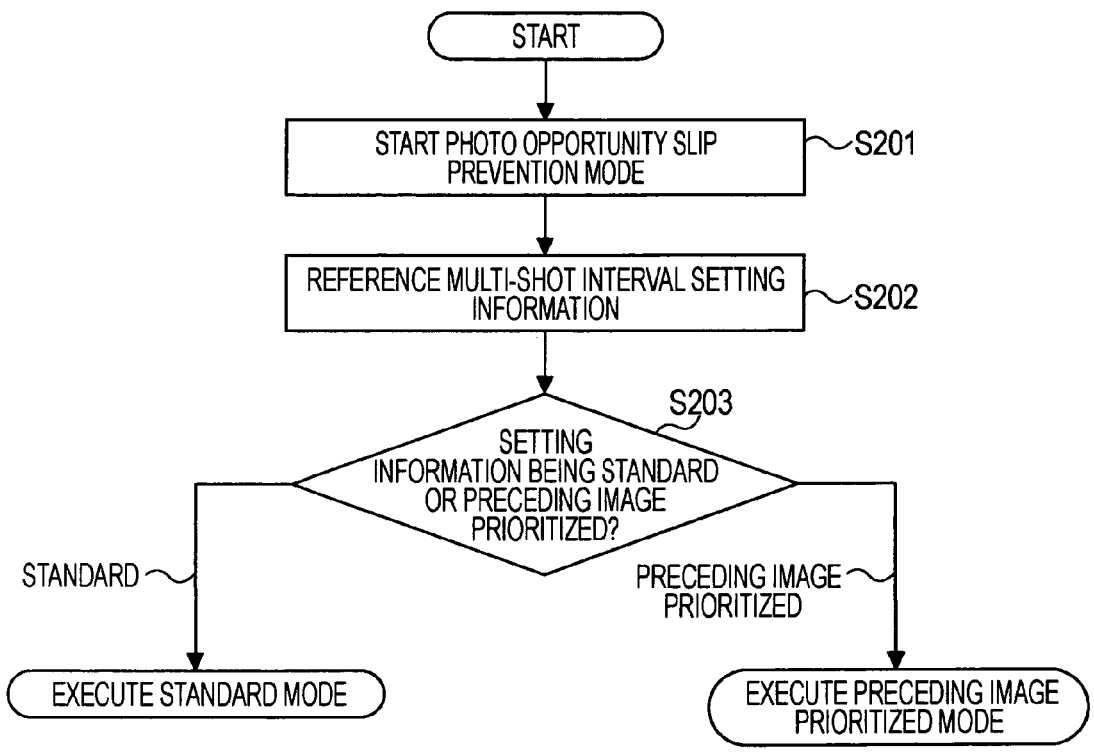
FIG. 7 is a flowchart illustrating a determination process of the multi-shot interval setting of the imaging device that performs the photographing and recording operation in the photo opportunity slip prevention function in accordance with one embodiment of the present invention.
Figure 8:
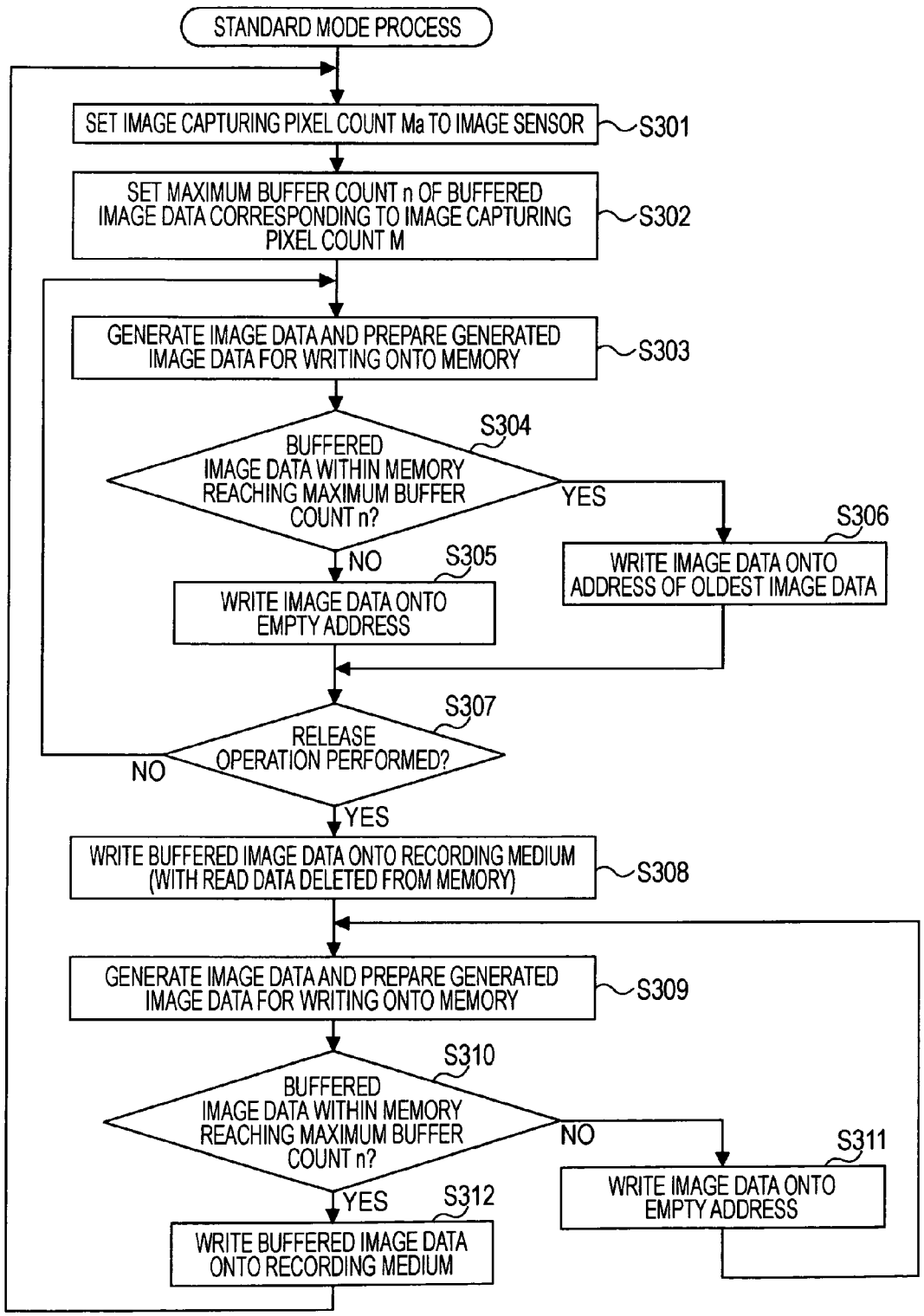
FIG. 8 is a flowchart illustrating an execution process of the photographing and recording operation in the standard mode of the photo opportunity slip prevention function in accordance with one embodiment of the present invention.
Figure 9:
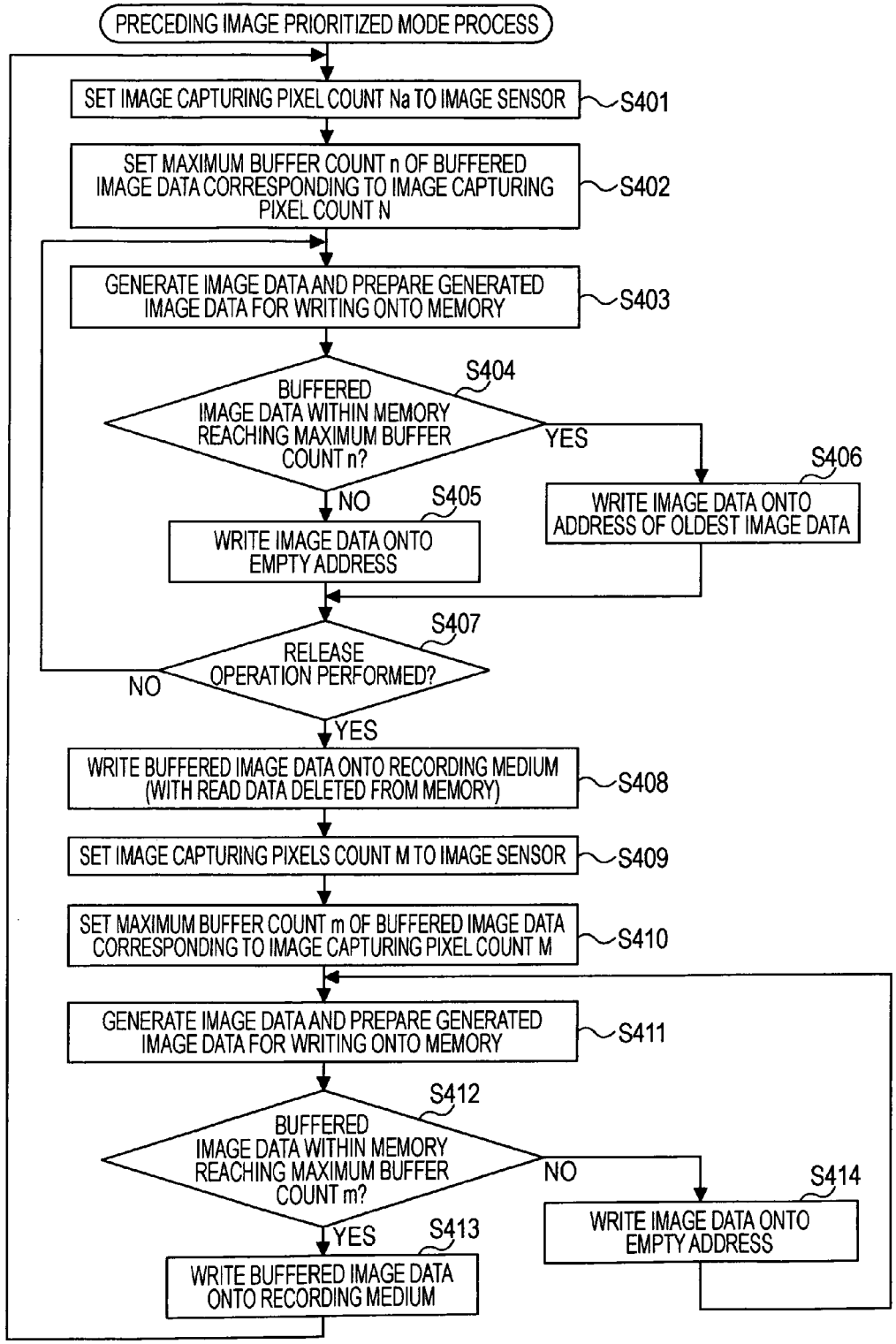
FIG. 9 is a flowchart illustrating an execution process of the photographing and recording operation in the preceding image prioritized mode of the photo opportunity slip prevention function in accordance with one embodiment of the present invention.

With reference to FIGS. 7-9, the process of the imaging device 1 performing the photographing operation in the photo opportunity slip prevention function is described below.

The user instructs the imaging device 1 to start the photographing operation in the photo opportunity slip prevention function by performing a predetermined operation. In step S201 of FIG. 7, the imaging device 1 set the photo opportunity slip prevention function to start the photographing operation. With the photographing operation triggered, the imaging device 1 starts generating the image data in response to the image signal from the image sensor 12. In response to the shutter release operation, the imaging device 1 is ready to store the image data onto the recording medium 30.

The imaging device 1 references in step S202 the multi-shot interval setting information stored on the flash memory 21 and determines in step S203 whether the multi-shot interval setting information indicates the standard mode or the preceding image prioritized mode.

If it is determined in step S203 that the multi-shot interval setting information indicates the standard mode, the imaging device 1 performs the photographing operation in the standard mode corresponding to the flowchart of FIG. 8. If it is determined in step S203 that the multi-shot interval setting information indicates the preceding image prioritized mode, the imaging device 1 performs the photographing operation in the preceding image prioritized mode corresponding to the flowchart of FIG. 9.

FIG. 8 illustrates the photographing operation in the standard mode.

Now that the photographing operation is triggered in step S201 of FIG. 7, the image sensor 12 in the imaging device 1 is operative. In step S301, the imaging device 1 sets a pixel count Ma for the pixel count M of the image data defined for the standard mode. The image sensor 12 hereinafter outputs the image signal captured by the pixel count Ma and the signal processor 14 generates the image data having the pixel count M.

In step S302, the imaging device 1 sets a maximum buffer count n of the buffered image data with the image data having the pixel count M. In other words, the imaging device 1 sets the count of units of buffered image data to be stored in an area of the memory 15 assigned to store the buffered image data (buffered image data area). This count can be obtained by dividing the memory capacity of the buffered image data area by the data size of the image data having the pixel count M. The memory capacity of the buffered image data is set based on the preceding image-capturing period T1 and the data size of the image data having the pixel count M.

In step S303, the signal processor 14 performs a process of generating the image data by receiving the image signal of one still image and preparing the generated image data for storage onto the memory 15. In step S304, the signal processor 14 determines whether the image data (buffered image data) stored on the memory 15 reaches a maximum number n of buffers. If the answer to the determination in step S304 is non-affirmative, the memory 15 has still an empty area available for storage of the buffered image data. In step S305, the image data generated in step S303 is written onto an address specified in the empty area. The image data is thus written onto the empty area. Step S305 corresponds to the storage of image data D(1)-D(n) onto the memory 15 as shown in FIG. 2.

If the answer to the determination in step S304 is affirmative, no further image data can be written onto the memory 15. In step S306, the imaging device 1 writes the image data generated in step S303 on an address containing the oldest buffered image data stored on the memory 15. More specifically, the latest image data overwrites the oldest buffered image data stored on the memory 15. Step S306 corresponds to a write cycle starting with image data D(n+1) subsequent to a first write cycle of the image data of FIG. 2.

Subsequent to one of steps S305 and S306, the imaging device 1 determines in step S307 whether a shutter release operation has been performed. If it is determined in step S307 that a shutter release operation has not been performed, processing returns to step S303. More specifically, in steps S303-S307, the imaging device 1 waits on standby for a shutter release operation while buffering the buffered image data on the memory 15.

If it is determined in step S307 that a shutter release operation has been performed, processing proceeds to step S308.

In step S308, the imaging device 1 controls writing of the buffered image data stored on the memory 15 as a still image file onto the recording medium 30. In this way, the preceding images are multi-shot recorded. The buffered image data read from the memory 15 to be stored onto the recording medium 30 is deleted from the memory 15.

In step S309, the signal processor 14 in the imaging device 1 generates the image data based on the input image signal and prepares the generated image data for storage on the memory 15. The imaging device 1 then determines in step S310 whether the image data stored on the buffered image data area of the memory 15 has reached a maximum number n of buffers. Since the preceding image-capturing period T1 is approximately equal to the subsequent image-capturing period T2, the same maximum number n of buffers as in step S304 is used in step S310 as well. If the subsequent image-capturing period T2 different from the preceding image-capturing period T1 is to be set, a different number of buffers may be set and step S310 is then performed.

If the answer to the determination in step S310 is non-affirmative, the imaging device 1 writes the image data generated in step S309 onto an address empty in the buffered image data area.

When the buffered image data stored on the buffered image data area of the memory 15 reaches the maximum number n of buffers, processing proceeds from step S310 to step S312.

In step S312, the imaging device 1 writes the image data stored on the memory 15 onto the recording medium 30. In this way, the multi-shot recording of the subsequent images has been performed. Subsequent to step S312, processing returns to step S301.

The photographing operation of the imaging device 1 in the preceding image prioritized mode is described below with reference to FIG. 9.

In step S401, the imaging device 1 sets a capturing pixel count Na for the pixel count N of the image data defined in the preceding image prioritized mode. The pixel count N in the preceding image prioritized mode is smaller than the pixel count M of the image data in the standard mode. The image capturing pixel count Na to be set in step S401 is smaller than an image capturing pixel count Ma set in the standard mode.

After the setting of the image capturing pixel count Na in step S401, the image sensor 12 outputs an image signal acquired with the image capturing pixel count Na and the signal processor 14 generates the image data responsive to the pixel count N.

In step S402, the maximum number n of buffers of buffered image data is set with the pixel count of the image data being N. As previously discussed with reference to FIGS. 3 and 4, the maximum number n of buffers to be set in the preceding image prioritized mode is larger than the maximum number n of buffers set with the pixel count N of the image data set in the standard mode, with the preceding image-capturing period T1 remaining unchanged.

The process performed in steps S403 through S408 is substantially identical to the process performed in steps S303 through S308 and the discussion thereof is omitted herein.

The pixel count N of the image data to be written in one of steps S405 and S406 is smaller than the pixel count M of the image data in the standard mode. The image data having the pixel count N is smaller in data size than the image data having the pixel count M. As previously discussed, the maximum number n of buffers set in step S402 is larger than the maximum number n of buffers set in step S302 of FIG. 8. More specifically, the number of units of image data stored on the buffered image data area of the memory 15 is greater in size than that in the standard mode.

The recording of the preceding images has been completed in response to the shutter release operation at the execution of step S408. In step S409, the pixel count Ma corresponding to the pixel count M of the subsequent images is set in the image sensor 12. The pixel count M is equal to the pixel count M of the image data set in the standard mode as previously discussed with reference to FIG. 4. More specifically, in step S409, an image capturing pixel count larger than the pixel count of the image data as the generated preceding images is set.

In step S410, the maximum number m of buffers of the buffered image data is set with the pixel count M corresponding to the pixel count Ma set in step S409. The pixel count M here equals the pixel count M of the image data in the standard mode. The maximum number m of buffers set in step S410 equals the maximum number n set in step S302 of FIG. 8 in the standard mode.

The process performed in steps S411 through S413 is substantially identical to the process performed in steps S310 through S312 of FIG. 8 and the discussion thereof is omitted herein. Through the process in steps S411 through S413, the image data of the m images is stored on the recording medium 30 as the still image file.

The image data is recorded in the photo opportunity slip prevention function as discussed with reference to the flowcharts of FIGS. 8 and 9 in conjunction with FIGS. 3 and 4. The image data as the preceding images stored on the memory 15 is recorded on the recording medium 30 with reference to the shutter release operation, and the image data storage area of the memory 15 is then emptied. New image data of a predetermined count of is successively stored onto the memory 15 and then recorded as the preceding images. More specifically, a cycle of the reading of the image data from the memory 15 and then the recording of the read image data onto the recording medium 30 is performed respectively twice, one for the preceding image group and one for the subsequent image group.

In such a procedure, the memory 15 having a small memory capacity works because the image data storage area of the memory 15 stores either the preceding images or the subsequent images.

The cycle of the reading of the image data from the memory 15 and the recording of the read image data onto the recording medium 30 is performed at timings different from the preceding images to the subsequent images. In such a case, the timing of starting generation and storage of the image data as the subsequent images onto the memory 15 can be delayed depending on characteristics of the memory 15 and a control algorithm to the recording medium 30.

Such an inconvenience can be overcome as described below.

An area for the preceding images and an area for the subsequent images are set up as the image data storage area in the memory 15. The preceding images and the image data thereof, present at the shutter release operation, remain stored on the image data storage area for the preceding images. The successive generation of the image data of the subsequent images is immediately started and then stored onto the image data storage area for the subsequent images. At the moment the required number of units of subsequent images is stored, the image data of the preceding images and the image data of the subsequent images, stored on the memory 15, are written onto the recording medium 30. Such a process may be performed by eliminating step S308 and writing, as the buffered image data, the image data of the preceding images and the subsequent images onto the recording medium 30 at a time in step S312 in the flowchart of FIG. 8. Also, such a process may be performed by eliminating step S408 and writing, as the buffered image data, the image data of the preceding images and the subsequent images onto the recording medium 30 at a time in step S413 in the flowchart of FIG. 9.

The present invention is not limited to the recording timings of the preceding images and the subsequent images described above. The present invention is not limited to the above-described embodiments.

In accordance with the above-referenced embodiments, the pixel count of the image data of the preceding images, namely, the multi-shot intervals in the preceding image-capturing period T1 may be switched from the standard mode to the preceding image prioritized mode. Alternatively, the pixel count may be switched twice or more within the preceding image prioritized mode.

The user interface for setting the multi-shot interval in the photo opportunity slip prevention function is not limited to the user interface discussed with reference to FIG. 5.

For example, the name of each mode is shown in each selection area for each multi-shot interval (namely, pixel count) to be set. Alternatively, the user interface may be set up so that a pixel count to be set is displayed for selection by the user.

To obtain more images per unit time, the preceding images have higher priority than the subsequent images. This setting is based on the premise that the photo opportunity slip is more likely to take place in the preceding images. However, the photo opportunity slip can take place more in the subsequent images depending on the operational status of the imaging device 1. In such a case, the subsequent images may have a higher priority than the preceding images so that more images are obtained in the subsequent images. A fixed pixel count serving as a predetermined standard is set for the preceding images (it is not necessary to make the pixel count of the preceding images equal to the pixel count of the subsequent images) and the pixel count of the subsequent images smaller than the predetermined standard may be set for the subsequent images.

In accordance with above-referenced embodiments of the present invention, the preceding image-capturing period T1 for acquiring the preceding images is set to be approximately equal to the subsequent image-capturing period T2 for acquiring the subsequent images. The number of units of image data as the preceding images and the subsequent images to be stored on the recording medium 30 changes depending on each of the preceding image-capturing period T1 and the subsequent image-capturing period T2. A modification of time length of each of the image-capturing periods is translated into a modification in the number of units of image data (still image file) to be stored on the recording medium 30.

The imaging device 1 is a digital still camera recording a captured image as a still image. A video recorder having a still image recording function identical to that of the digital still camera is known. Such a video recorder records a captured moving image as a digital signal. The present invention is also applicable to the still image recording function for such a video recorder. The present invention is also applicable to a wide range of electronic devices having an imaging function including a mobile phone and other terminals.

Modifications and changes may be incorporated in the multi-shot interval setting process in the photo opportunity slip prevention function and the photographing and recording operation, discussed with reference to the flowcharts of FIGS. 6-9.

With reference to FIGS. 8 and 9, the maximum number of buffers for the buffered image data is determined and whether to store the buffered image data onto the memory 15 is determined based on the determination as to whether the maximum number of buffers has been reached. Alternatively, an available memory capacity for the buffered image data may be compared with the data size of the image data to be written.

With reference to FIGS. 8 and 9, the image data B(1)-B(n) generated subsequent to time point t1 is stored on the memory 15 in the subsequent image-capturing period T2 and then recorded onto the recording medium 30. Alternatively, without storing the image data B(1)-B(n) on the memory 15, the image data B(1)-B(n) is successively transferred to the encoder/decoder 16 and then recorded on the recording medium 30.

The process steps described in FIGS. 7-9 may be carried out when the controller 18 as the CPU performs the computer program thereof. Such a computer program may be pre-stored on one of the ROM 19 and the flash memory 21 in the configuration shown in FIG. 1 in a manufacturing phase of the imaging device 1. For example, the computer program may be stored in a package medium, an external storage device, or a sever on a network, and then installed onto and updated on the imaging device 1 from such a recording medium or a device.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
   image signal acquisition means for acquiring an image signal in an electrical form by converting input image-bearing light into the image signal;
   data generation means for generating successively image data containing a still image by inputting successively the image signal corresponding to one still image unit;
   data storage control means for storing, on a predetermined memory thereof, the image data generated by the data generation means, the image data acquired in retrospect within a unit time before a current time point;
   record control means for recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored on the data storage control means at the timing of the shutter release operation, and the image data subsequent to the shutter release operation being generated during a predetermined period of time extending from the timing of the shutter release operation to a later time point;
   operation means for performing an operation to modify a pixel count of the image data on one of the image data prior to the shutter release operation and the image data subsequent to the shutter release operation, the image data containing a two-dimensional set of pixels; and
   pixel count setting control means for controlling setting of the pixel count so that the pixel count of one of the image data prior to the shutter release operation and the image data subsequent to the shutter release operation specified in the operation performed by the operation means reaches the pixel count specified in the operation of the operation means and so that the pixel count of the other of the image data prior to the shutter release operation and the image data subsequent to the shutter release operation reaches a predetermined pixel count set as a standard value,
   wherein the operation means performs the operation to modify a pixel count of the image data prior to the shutter release operation, and wherein if the pixel count specified in the operation of the operation means is different from the pixel count of the image data subsequent to the shutter release operation, the pixel count setting control means controls setting of the pixel count so that the pixel count of the image data prior to the shutter release operation reaches the pixel count set by the operation means and so that the pixel count of the image data subsequent to the shutter release operation reaches the predetermined pixel count set as the standard value, and wherein the pixel count setting control means controls setting of the pixel count so that each of the image data prior to the shutter release operation and the image data subsequent to the shutter release operation reaches the predetermined pixel count set as the standard value if the pixel count set in the operation of the operation means is the same as the pixel count of an index data subsequent to the shutter release operation.

2. The imaging device according to claim 1, wherein the pixel count setting control means specifies, in the control operation thereof to form a predetermined pixel count in the image data, a pixel count as the pixel count to be used to acquire a valid image signal in an image sensor forming the image signal acquisition means.

3. An image signal processing method, comprising steps of:
   acquiring an image signal in an electrical form by converting input image-bearing light into the image signal; generating successively image data containing a still image by inputting successively the image signal corresponding to one still image unit;
   storing, on a predetermined memory, the generated image data, the image data acquired in retrospect within a unit time before a current time point;
   recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored at the timing of the shutter release operation, and the image data subsequent to the shutter release operation being generated during a predetermined period of time extending from the timing of the shutter release operation to a later time point;

storing setting information relating to the pixel count modified in response to a modification operation of the pixel count of the image data performed on one of the image data prior to the shutter release operation and the image data subsequent to the shutter release operation, the image data containing a two-dimensional set of pixels; and controlling setting of the pixel count so that the pixel count of one of the image data prior to the shutter release operation and the image data subsequent to the shutter release operation, modified in the modification operation, reaches the pixel count specified in the setting information and so that the pixel count of the other of the image data prior to the shutter release operation and the image data subsequent to the shutter release operation, unmodified in the modification operation, reaches a predetermined pixel count set as a standard value, wherein the modification operation modifies a pixel count of the image data prior to the shutter release operation, and wherein if the pixel count specified in the modification operation is different from the pixel count of the image data subsequent to the shutter release operation, the controlling setting of the pixel count is performed so that the pixel count of the image data prior to the shutter release operation reaches the pixel count set by the modification operation and so that the pixel count of the image data subsequent to the shutter release operation reaches the predetermined pixel count set as the standard value, and wherein the controlling setting of the pixel count is performed so that each of the image data prior to the shutter release operation and the image data subsequent to the shutter release operation reaches the predetermined pixel count set as the standard value if the pixel count set in the modification operation is the same as the pixel count of an index data subsequent to the shutter release operation.

4. A computer program stored in a recording medium in an imaging device, the computer program when executed performing steps of:

generating successively image data containing a still image by inputting successively an image signal in an electrical form corresponding to one still image unit, the image signal converted from input image-bearing light;

storing, on a predetermined memory, the generated image data, the image data acquired in retrospect within a unit time before a current time point; recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored at the timing of the shutter release operation, and the image data subsequent to the shutter release operation being generated during a predetermined period of time extending from the timing of the shutter release operation to a later time point;

storing setting information relating to the pixel count modified in response to a modification operation of the pixel count of the image data performed on one of the image data prior to the shutter release operation and the image data subsequent to the shutter release operation, the image data containing a two-dimensional set of pixels; and controlling setting of the pixel count so that the pixel count of one of the image data prior to the shutter release operation and the image data subsequent to the shutter release operation, modified in the modification operation, reaches the pixel count specified in the setting information and so that the pixel count of the other of the image data prior to the shutter release operation and the image data subsequent to the shutter release operation, unmodified in the modification operation, reaches a predetermined pixel count set as a standard value, wherein the modification operation modifies a pixel count of the image data prior to the shutter release operation, and wherein if the pixel count specified in the modification operation is different from the pixel count of the image data subsequent to the shutter release operation, the controlling setting of the pixel count is performed so that the pixel count of the image data prior to the shutter release operation reaches the pixel count set by the modification operation and so that the pixel count of the image data subsequent to the shutter release operation reaches the predetermined pixel count set as the standard value, and wherein the controlling setting of the pixel count is performed so that each of the image data prior to the shutter release operation and the image data subsequent to the shutter release operation reaches the predetermined pixel count set as the standard value if the pixel count set in the modification operation is the same as the pixel count of an index data subsequent to the shutter release operation.

5. An imaging device, comprising:

an image signal acquisition unit acquiring an image signal in an electrical form by converting input image-bearing light into the image signal; a data generation unit generating successively image data containing a still image by inputting successively the image signal corresponding to one still image unit;

a data storage control unit storing, on a predetermined memory thereof, the image data generated by the data generation unit, the image data acquired in retrospect within a unit time before a current time point;

a record control unit recording, on a recording medium, the image data prior to a shutter release operation and the image data subsequent to the shutter release operation, the shutter release operation being performed to acquire the image data in response to an operation timing and to store the acquired image data onto the recording medium, the image data prior to the shutter release operation being stored on the data storage control unit at the timing of the shutter release operation, and the image data subsequent to the shutter release operation being generated during a predetermined period of time extending from the timing of the shutter release operation to a later time point;

an operation unit performing an operation to modify a pixel count of the image data on one of the image data prior to the shutter release operation and the image data subsequent to the shutter release operation, the image data containing a two-dimensional set of pixels; and a pixel count setting control unit controlling setting of the pixel count so that the pixel count of one of the image data prior to the shutter release operation and the image data subsequent to the shutter release operation specified in the operation performed by the operation unit reaches the pixel count specified in the operation of the operation unit and so that the pixel count of the other of the image data prior to the shutter release operation and the image data subsequent to the shutter release operation reaches a predetermined pixel count set as a standard value, wherein the operation unit performs the operation to modify a pixel count of the image data prior to the shutter release operation, and wherein if the pixel count specified in the operation of the operation unit is different from the pixel count of the image data subsequent to the shutter release operation, the pixel count setting control unit controls setting of the pixel count so that the pixel count of the image data prior to the shutter release operation reaches the pixel count set by the operation unit and so that the pixel count of the image data subsequent to the shutter release operation reaches the predetermined pixel count set as the standard value, and wherein the pixel count setting control unit controls setting of the pixel count so that each of the image data prior to the shutter release operation and the image data subsequent to the shutter release operation reaches the predetermined pixel count set as the standard value if the pixel count set in the operation of the operation unit is the same as the pixel count of an index data subsequent to the shutter release operation.

* * * * *